(12) United States Patent
Laude

(10) Patent No.: US 9,022,318 B2
(45) Date of Patent: May 5, 2015

(54) HYDRAULIC DRIVE, HYDRAULIC SUPPLY DEVICE, AIRPLANE WITH A HYDRAULIC SUPPLY DEVICE AND METHOD FOR CONFIGURING A HYDRAULIC SUPPLY DEVICE

(75) Inventor: Juergen Laude, Bremen (DE)

(73) Assignee: Airbus Operations GmbH, Hamburg (DE)

(*) Notice: Subject to any disclaimer, the term of this patent is extended or adjusted under 35 U.S.C. 154(b) by 1302 days.

(21) Appl. No.: 12/678,428

(22) PCT Filed: Sep. 17, 2008

(86) PCT No.: PCT/EP2008/007778
§ 371 (c)(1),
(2), (4) Date: Mar. 16, 2010

(87) PCT Pub. No.: WO2009/036970
PCT Pub. Date: Mar. 26, 2009

(65) Prior Publication Data
US 2010/0193631 A1 Aug. 5, 2010

Related U.S. Application Data

(60) Provisional application No. 60/972,838, filed on Sep. 17, 2007.

(30) Foreign Application Priority Data

Sep. 17, 2007 (DE) .......................... 10 2007 044 229

(51) Int. Cl.
*B64D 27/18* (2006.01)
*B64D 27/26* (2006.01)
(Continued)

(52) U.S. Cl.
CPC ............... *B64D 27/18* (2013.01); *B64D 27/26* (2013.01); *B64D 33/00* (2013.01); *F01D 15/08* (2013.01);
(Continued)

(58) Field of Classification Search
USPC .................. 60/787, 788, 793, 802; 244/53 R, 244/99.2–99.6, 99.9
See application file for complete search history.

(56) References Cited

U.S. PATENT DOCUMENTS 2,296,006 A  9/1942  Wagner
2,409,159 A * 10/1946  Singleton ........................ 165/62
(Continued)

FOREIGN PATENT DOCUMENTS

DE  854893 C  11/1952
DE  2549771 A1  5/1976
(Continued)

OTHER PUBLICATIONS

International Search Report for corresponding PCT application PCT/EP08/007778, dated Sep. 21, 2009.
(Continued)

*Primary Examiner* — Troy Chambers
*Assistant Examiner* — Jamie S Stehle
(74) *Attorney, Agent, or Firm* — Ingrassia Fisher & Lorenz, P.C.

(57) ABSTRACT

A hydraulic drive for an aircraft includes: a gear, a first hydraulic pump and a second hydraulic pump, wherein the gear is installed in a gear housing and wherein the first hydraulic pump and the second hydraulic pump in each case are installed in a pump housing that is affixed to the gear housing, or the two together are installed in a pump housing that is affixed to the gear housing; a hydraulic supply device including a first and a second hydraulic system for operating actuators of the aircraft; and a monitoring and drive device, with the hydraulic supply device including a first hydraulic drive for coupling the latter to a first engine, and a second hydraulic drive for coupling the latter to a second engine, wherein each hydraulic drive includes: a gear drive shaft for coupling the respective hydraulic drive to an engine output shaft of the respective associated engine; two hydraulic pumps that are coupled to a gear output shaft, in each case with a connection device for connecting the hydraulic pump to the pressure line and to the suction line of a hydraulic system; an aircraft comprising such a hydraulic supply device; as well as a method for configuring a hydraulic supply device.

5 Claims, 3 Drawing Sheets

(51) Int. Cl.
  *B64D 33/00* (2006.01)
  *F01D 15/08* (2006.01)
  *F01D 21/00* (2006.01)
  *F02C 7/236* (2006.01)
  *F02C 7/32* (2006.01)
  *F02C 9/46* (2006.01)

(52) U.S. Cl.
  CPC ............... *F01D 21/00* (2013.01); *F02C 7/236* (2013.01); *F02C 7/32* (2013.01); *F02C 9/46* (2013.01); *F05D 2260/84* (2013.01); *F05D 2240/40* (2013.01); *F05D 2260/4023* (2013.01); *F05D 2260/80* (2013.01); *F05D 2260/85* (2013.01); *F05D 2270/56* (2013.01); *F05D 2270/64* (2013.01)

(56) References Cited

U.S. PATENT DOCUMENTS

| | | | |
|---|---|---|---|
| 2,509,813 | A | 5/1950 | Dineen |
| 2,978,209 | A | 4/1961 | Kerry |
| 2,978,869 | A | 4/1961 | Hiscock et al. |
| 3,220,218 | A | 11/1965 | Rio |
| 3,799,476 | A | 3/1974 | Bouiller |
| 3,965,673 | A * | 6/1976 | Friedrich ................. 60/788 |
| 4,068,470 | A | 1/1978 | Sargisson |
| 4,077,202 | A * | 3/1978 | Schutze ................. 60/788 |
| 4,456,425 | A | 6/1984 | McCarty |
| 4,542,722 | A * | 9/1985 | Reynolds ................. 123/179.19 |
| 4,864,812 | A * | 9/1989 | Rodgers et al. ............ 60/39.091 |
| 4,936,748 | A | 6/1990 | Adamson |
| 5,195,401 | A | 3/1993 | Mouton |
| 5,687,561 | A | 11/1997 | Newton |
| 6,023,134 | A | 2/2000 | Besing et al. |
| 6,142,418 | A * | 11/2000 | Weber et al. .................... 244/58 |
| 7,600,717 | B2 | 10/2009 | Ward |
| 2006/0248900 | A1 | 11/2006 | Suciu et al. |
| 2006/0260323 | A1 | 11/2006 | Moulebhar |
| 2009/0212162 | A1 | 8/2009 | Ward |

FOREIGN PATENT DOCUMENTS

| | | |
|---|---|---|
| DE | 2241454 B2 | 10/1979 |
| DE | 4131713 A1 | 4/1993 |
| DE | 69208257 T2 | 6/1996 |
| EP | 0247641 A2 | 12/1987 |
| EP | 1762487 A2 | 3/2007 |
| FR | 2494342 A1 | 5/1982 |
| GB | 626036 A | 7/1949 |
| JP | 2000344200 A1 | 12/2000 |
| WO | 9306007 A1 | 4/1993 |

OTHER PUBLICATIONS

International Preliminary Report on Patentability for corresponding PCT application PCT/EP08/007778, Apr. 7, 2010.

* cited by examiner

HYDRAULIC DRIVE, HYDRAULIC SUPPLY DEVICE, AIRPLANE WITH A HYDRAULIC SUPPLY DEVICE AND METHOD FOR CONFIGURING A HYDRAULIC SUPPLY DEVICE

CROSS REFERENCE TO RELATED APPLICATIONS

This application claims priority to PCT Application No. PCT/EP2008/007778, filed Sep. 17, 2008; claims priority to German Patent Application No. DE 10 2007 044 229.9, filed Sep. 17, 2007; and claims the benefit of U.S. Provisional Patent Application No. 60/972,838, filed Sep. 17, 2007, the entire disclosures of which applications are hereby incorporated herein by reference.

BACKGROUND

The invention relates to a hydraulic drive, a hydraulic supply device, an aircraft comprising such a hydraulic supply device, as well as a method for configuring a hydraulic supply device.

In US 2006/0260323 A1 an arrangement of generators and pumps which are coupled to a gear coupled to an engine is described, which are disconnected in an emergency case or which are operated with a different input for maintenance purposes.

U.S. Pat. No. 6,023,134 discloses a hydraulic and electrical power system Versorgungssysteme jeweils mit an einer Triebwerkswelle angekoppelten Pumpen and Generatoren.

In WO 93/06007 an engine with an output shaft is shown which is coupled to an engine shaft and to which hydraulic pumps and generators are coupled.

Documents US 2006/0248900 A1, U.S. Pat. No. 2,978,209 A1 and U.S. Pat. No. 2,978,869 each describe an engine with an accessory gearbox coupled thereto.

In DE 692 08 257 T2 a bypass gas turbine engine is described that is suspended from the wing of an aircraft by means of a pylon. A load transmitting shaft is used to drive auxiliary machines of the aircraft. To this effect a further shaft is coupled to the load transmitting shaft, which further shaft drives a gear that is arranged in the interior of the engine pylon on which the auxiliary machines are affixed.

From DE 41 31 713 A1, for example, an aircraft engine comprising a core-mounted engine and two fan rotors is known in which a power shaft, which is arranged in the inlet housing of the high-pressure compressor and is connected to a high-pressure compressor shaft of the core-mounted engine, for transmitting shaft output to auxiliary devices of the engine and of the aircraft is provided.

SUMMARY OF THE INVENTION

According to the invention a hydraulic drive for an aircraft is provided, with said hydraulic drive comprising:
- a gear comprising a gear drive shaft for rotary coupling to an engine output shaft of an engine that is associated with the hydraulic drive, and comprising a gear driven shaft,
- a first hydraulic pump and a second hydraulic pump, each comprising a connection for a pressure line and a connection for a suction line of a hydraulic system, and each comprising a hydraulic-pump drive shaft which are each connected to the gear driven shaft by way of a coupling device, wherein the gear is installed in a gear housing, and wherein the first hydraulic pump and the second hydraulic pump are each installed in a pump housing that is affixed to the gear housing, or the two together are installed in a pump housing that is affixed to the gear housing.

The coupling device for coupling the first hydraulic pump to the gear drive shaft or the coupling device for coupling the second hydraulic pump to the gear driven shaft can be a decouplable clutch. As an alternative, the coupling device for coupling the first hydraulic pump to the gear drive shaft and the coupling device for coupling the second hydraulic pump to the gear driven shaft (14) can be decouplable clutches.

In this arrangement the first hydraulic pump and the second hydraulic pump can each comprise a decouplable and couplable clutch. As an alternative to this it can be provided for the hydraulic pumps to each comprise a pump drive shaft, at least one of which is couplable to, or decouplable from, the gear drive shaft, in each case by way of a clutch arranged in the gear housing (13*a*).

In this exemplary embodiment it can, in particular, be provided for the gear to comprise:
- a first gear wheel that is nonrotationally coupled to the gear driven shaft, an intermediate wheel that is rotationally coupled to the first gear wheel, and a second gear wheel that is rotationally coupled to the intermediate wheel,
- a first clutch by means of which the pump drive shaft of the first hydraulic pump is couplable to, and decouplable from, the first gear wheel,
- a second clutch by means of which the pump drive shaft of the second hydraulic pump is couplable to, and decouplable from, the second gear wheel.

The hydraulic pumps can comprise a variable transmission gear. Likewise, in the alternative embodiment with a gear provided outside the hydraulic pumps the gear can be variable. In particular, the gear can be a sliding-element gear.

Furthermore, it can be provided for the hydraulic pumps to be able to be switched on and off by means of a monitoring and drive device.

According to the invention, also provided are a hydraulic supply device of an aircraft, comprising a first and a second hydraulic system for operating actuators of the aircraft, and a monitoring and drive device, wherein the hydraulic supply device comprises a first hydraulic drive for coupling the latter to a first engine, and a second hydraulic drive for coupling the latter to a second engine, wherein each hydraulic drive comprises: a gear drive shaft for coupling the respective hydraulic drive to an engine output shaft of the respective associated engine; two hydraulic pumps that are coupled to a gear output shaft, each comprising a connection device for connecting the hydraulic pump to the pressure line and to the suction line of a hydraulic system. In this arrangement it can also be provided for each gear to comprise a clutch device by means of which clutch device coupling or decoupling of one of the two hydraulic pumps and of the respective associated gear driven shaft (1*a*, 1*b*) can take place by means of an operating device. Each gear can comprise two clutch devices by means of which clutch devices coupling or decoupling of both hydraulic pumps and of the respective associated gear drive shaft can take place by means of an operating device.

Furthermore, it can be provided for the monitoring and drive device, in response to a signal that it receives due to failure of one of the two engines, to transmit activation signals for coupling the two clutches to the hydraulic drive that is associated with the engine that has not failed.

As an alternative to this, it can be provided for the monitoring and drive device to monitor the state of the clutches of the hydraulic drives, and for the monitoring and drive device in each case to carry out the following action in relation to the hydraulic drive that is associated with the engine that has not failed:
- if the monitoring and drive device considers both clutches of the hydraulic drive to be engaged, not to transmit an activation signal for activating one of the clutches of the hydraulic drive,
- if the monitoring and drive device considers one of the clutches of the hydraulic drive to be disengaged, to transmit an activation signal for engaging this clutch to the respective hydraulic drive,
- if the monitoring and drive device considers both clutches of the hydraulic drive to be disengaged, in each case to transmit to both clutches of the respective hydraulic drive an activation signal for activating both clutches for engaging both clutches.

In these embodiments it can further be provided for
- in each case a pressure switch to be arranged in the pressure line downstream of each hydraulic pump, which pressure switch is functionally coupled to the monitoring and drive device and which pressure switch transmits a signal to the former if the hydraulic pressure in the line of a hydraulic system drops below a predetermined set pressure value,
- the monitoring and drive device to comprise a function by means of which, in response to a signal from the pressure switch as a result of the value of the pressure in the pressure line of a hydraulic pump downstream of said hydraulic pump being below the set pressure value, said monitoring and drive device to transmit a control signal for disengaging the respective hydraulic pump to that clutch which is associated with the hydraulic pump on the suction line with the pressure switch that sent the signal.

Furthermore, in relation to the hydraulic supply device it can be provided for
- each hydraulic system to comprise a liquids reservoir comprising a filling level sensor that is functionally connected to the monitoring and drive device, which filling level sensor transmits a signal to the monitoring and drive device when the filling level drops below a filling level minimum value,
- the monitoring and drive device to comprise a function by means of which in response to a signal from the filling level sensor, due to the filling level dropping below the minimum value, a control signal is transmitted to the clutches of those hydraulic pumps that are connected to that hydraulic system to which the liquids reservoir with the filling level sensor belongs which has transmitted the signal.

The monitoring and drive device can generally be functionally connected to each hydraulic pump and can comprise a function by means of which the monitoring and drive device can transmit a drive signal to each hydraulic pump, based on which the hydraulic pump is switched off.

In the embodiments according to the invention, of the hydraulic supply device, it is also possible to provide for each of the two hydraulic systems to comprise connection devices for supplying the actuators of retraction and extension mechanisms of the aircraft's undercarriage.

The gear can be a transfer case, and the hydraulic pumps can be rotary-speed controlled.

Furthermore, it can be provided for the gear to be an adjustable transmission gear; for the monitoring and drive device to comprise a function by means of which a desired rotary speed or a desired rotary speed range is predetermined for the hydraulic pump; for the monitoring and drive device to transmit the desired rotary speed or the desired rotary speed range to a gear controller that is functionally connected to the gear; and for the gear controller to be designed such that it controls the gear such that the respective hydraulic pump adheres to the predetermined desired rotary speed or to the predetermined desired rotary speed range.

The hydraulic supply device according to the invention can generally comprise two, or more than two, hydraulic drives according to an embodiment according to the invention.

According to a further aspect of the invention, an aircraft comprising a hydraulic supply device and comprising two engines, each affixed to an engine pylon, comprising several hydraulic systems for operating actuators of the aircraft and comprising a monitoring and drive device for setting the hydraulic systems is provided, wherein the hydraulic supply device comprises: a hydraulic drive that is coupled to an engine by way of a drive shaft, wherein the hydraulic drive is arranged on an engine pylon and behind the engine burst region of the respective engine.

In particular it is provided for the engine burst region to be situated in a region in front of the surface of a cone of a straight circular cone whose tip is situated in the centre of the rearmost turbine wheel of the engine and whose half opening angle $\alpha$ is 10 degrees.

The aircraft can, in particular, comprise a hydraulic supply device according to an embodiment according to the invention.

In this arrangement it can be provided
- for the monitoring and drive device to be functionally connected to a flight control function and to be functionally connected to each hydraulic pump,
- for the monitoring and drive device to comprise a function which in response to a signal from the flight control function, which signal indicates a cruising operating state of the aircraft, transmits a command signal in each case to a hydraulic pump of a hydraulic system to switch off said hydraulic pump, wherein the hydraulic pumps are driven by two different engines and wherein the hydraulic systems drive different hydraulic systems.

According to a further aspect of the invention, a method for reconfiguring or setting a hydraulic system of an aircraft is provided, in which method a monitoring and drive device of the aircraft in response to a signal from a flight control function that indicates a cruising operating state transmits a command signal in each case to two hydraulic pumps that drive two different hydraulic systems, in order to switch said hydraulic pumps off, wherein the hydraulic pumps in each case are mechanically coupled to one of two different engines, and in this arrangement in each case one of several hydraulic pumps are each coupled to one of the two different engines.

In this arrangement it can be provided for the two hydraulic pumps of a hydraulic supply system, which pumps have been switched off due to the signal due to a cruising operating state, to be switched on again as soon as a flight phase with increased energy requirements and safety requirements is initiated or attained.

According to a further aspect of the invention, a method for reconfiguring or setting a hydraulic system of an aircraft is provided in which a monitoring and drive device of the aircraft in response to a signal from an aircraft system function, which signal indicates damage to one of several engines of the aircraft, transmits activation signals for engaging the two clutches to the hydraulic drive that is not associated with the failed engine.

According to a further aspect of the invention, a method for reconfiguring or setting a hydraulic system of an aircraft is provided, in which method a monitoring and drive device of the aircraft monitors the clutch state of the clutches of the hydraulic drives, and the monitoring and drive device in each case carries out the following action in relation to the hydraulic drive that is associated with the engine that has not failed:

- does not transmit an activation signal for activating one of the clutches of the hydraulic drive if the monitoring and drive device considers both clutches of the hydraulic drive to be engaged,
- transmits an activation signal for engaging this clutch to the respective hydraulic drive if the monitoring and drive device considers one of the clutches of the hydraulic drive to be disengaged,
- in each case transmits to both clutches of the respective hydraulic drive an activation signal for activating both clutches for engaging both clutches if the monitoring and drive device considers both clutches of the hydraulic drive to be disengaged.

It is the object of the invention to provide a hydraulic drive, a hydraulic supply device, an aircraft comprising such a hydraulic supply device as well as a method for configuring a hydraulic supply device, by means of which an advantageous safety concept for an aircraft can be implemented.

BRIEF DESCRIPTION OF THE DRAWINGS

Below, exemplary embodiments of the invention are described with reference to the enclosed figures as follows.

DETAILED DESCRIPTION OF THE INVENTION

Figure 1:
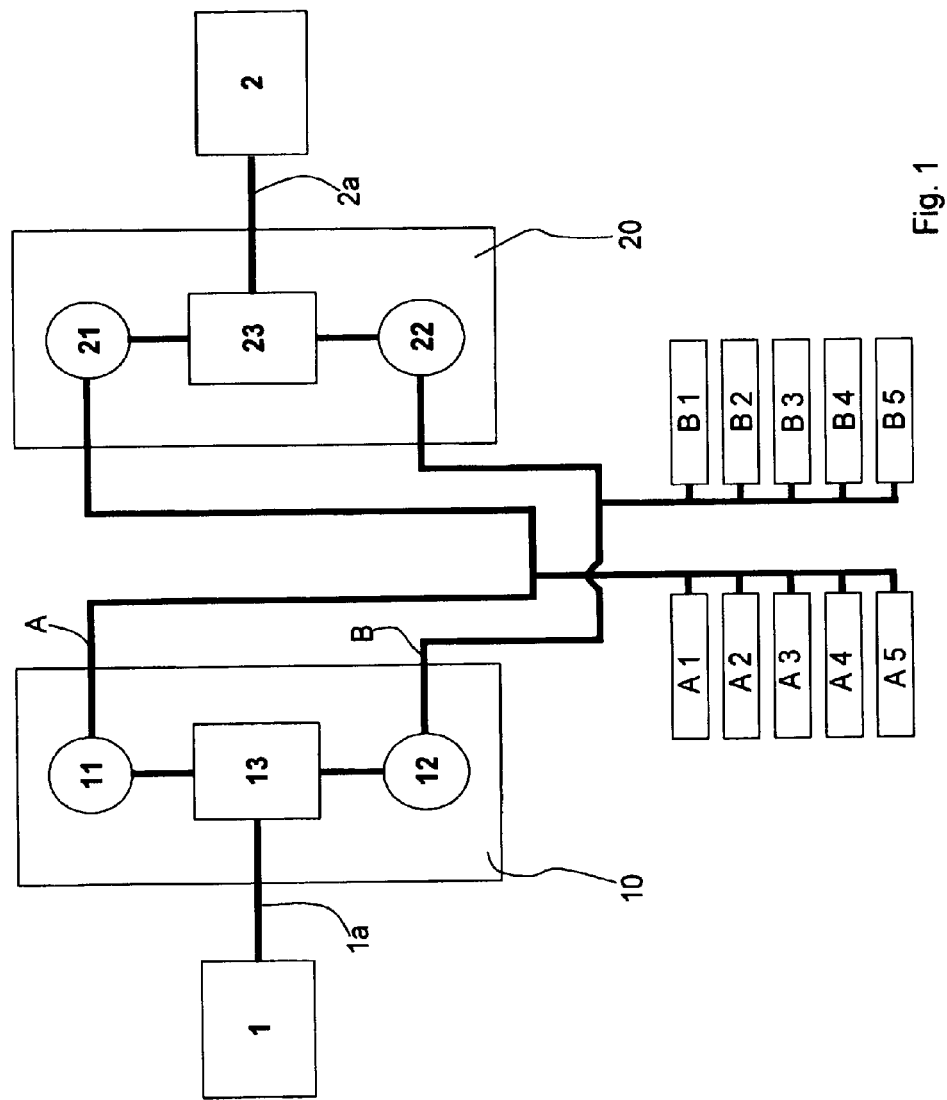
FIG. 1 shows a functional diagram of an embodiment of a hydraulic supply device comprising a first hydraulic system and a second hydraulic system for supplying consumers that are coupled to said hydraulic supply device.

The solutions according to the invention are provided in particular for an aircraft F with a first engine 1 and a second engine 2 that are in each case affixed to one of the two wings 3 or 4, and with undercarriages such as a nose undercarriage and a main undercarriage 5 which are retractable and extendable by means of an adjustment mechanism. The aircraft F comprises a hydraulic supply device H with a first hydraulic system A and a second hydraulic system B. Furthermore, a first engine 1 is associated with a first hydraulic drive 10 and a second engine 2 is associated with a second hydraulic drive 20.

Figure 2:
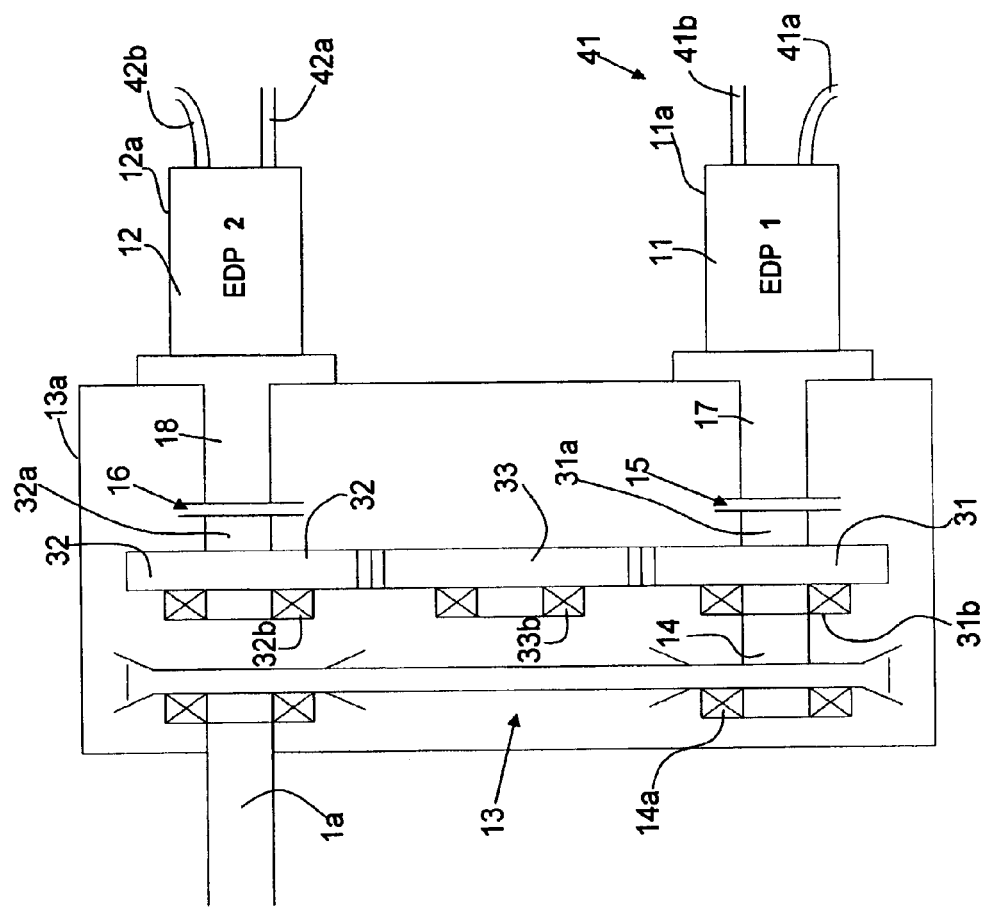
FIG. 2 shows a lateral view of an engine comprising a shaft, provided according to an exemplary embodiment of the invention, for connecting an output shaft of the engine to a hydraulic drive.

According to the invention, as also shown in the functional diagram of an embodiment of a hydraulic supply device according to FIG. 2, the first hydraulic drive 10 is associated with a first engine 1 and the second hydraulic drive 20 is associated with a second engine 2. In this arrangement the first hydraulic drive 10 is driven by the first engine 1 by way of a first drive shaft 1a, and the second hydraulic drive 20 is driven by the second engine 2 by way of a second drive shaft 2a. The drive shaft 1a, 2a is coupled to an engine shaft or turbine shaft and in particular a load transmitting shaft of the respective associated engine 1, 2, and is thus driven by the engine 1 or 2. The drive shaft 1a, 2a can be coupled to the respective engine shaft by way of a gear.

In particular, embodiments of the hydraulic drive 10, 20 according to the invention can be provided for the hydraulic supply device. An exemplary embodiment of the hydraulic supply device is described with reference to FIG. 1. The first hydraulic drive 10, which is provided for the hydraulic supply device, comprises a first hydraulic pump 11 and a second hydraulic pump 12, which in each case can be driven by way of the first drive shaft 1a. One of the hydraulic pumps 11, 12 or each of the hydraulic pumps 11, 12 of the first hydraulic drive 10 is coupled, in each case by way of a clutch, to a gear 13 of the first hydraulic drive 10. In an analogous manner the second hydraulic drive 20 comprises a first hydraulic pump 21 and a second hydraulic pump 22 which can be driven by way of the second drive shaft 2a, and at least one of the hydraulic pumps 21, 22 of the second hydraulic drive 2 is coupled, in each case by way of a clutch, to a gear 23 of the second hydraulic drive 2. The respective first hydraulic pump 11, 21 and the respective second hydraulic pump 12, 22 in each case comprise a connection for a pressure line and a connection for a suction line of a hydraulic system and in each case a hydraulic-pump drive shaft. Thus the respective first hydraulic pump 11, 21 can be connected, by way of the connection for the pressure line and a connection for the suction line, to a first hydraulic system A and the respective second hydraulic pump 12, 22 can likewise be connected, by way of such a connection for the pressure line and a connection for the suction line, to a second hydraulic system B.

The hydraulic supply device H according to the invention comprises a first and a second hydraulic system A, B for operating actuators of the aircraft, and a monitoring and drive device (not shown in the figures) for driving the hydraulic drives of the hydraulic supply device H in order to monitor, set and/or change their operating states. For operating the hydraulic systems A, B a first hydraulic drive 10, driven by a first engine 1, and a second hydraulic drive 20, driven by a second engine 2, are provided. The engines are affixed to the aircraft on opposite sides in relation to the longitudinal axis of the aircraft, preferably in a symmetrical manner. Each hydraulic drive 10, 20 comprises: a gear drive shaft 1a or 2a for coupling to an engine output shaft of the respective associated engine 1 or 2, two hydraulic pumps 11, 12 or 21, 22, coupled to a gear output shaft, each comprising a connection device 41 or 42 for connecting the hydraulic pump to the pressure line and to the suction line of a hydraulic system A or B. The gear drive shaft 1a or 2a can be identical to the engine output shaft or generally the engine shaft. As shown in FIG. 1, the respective first hydraulic pumps 11, 21 with in each case a connection device for the pressure line and suction line of the respective hydraulic pump are connected to the first hydraulic system A or hydraulic line system, and likewise the in each case second hydraulic pumps 12, 22 with in each case a connection device for the pressure line and suction line of the respective hydraulic pump are connected to the second hydraulic system B or hydraulic line system. Thus each hydraulic drive 10, comprises a hydraulic pump 11, 21 for operating the first hydraulic system A, and comprises a second hydraulic pump 12, 22 for operating the second hydraulic system B.

With each hydraulic system A, B a multitude of consumers are supplied and driven which can, in particular, be actuators A1, A2, A3, A4 or B1, B2, B3, B4 or one or several undercarriage-adjustment mechanisms A5 or B5. The undercarriage-adjustment mechanisms A5 or B5 can, in particular, be mechanisms for retracting and extending a nose undercarriage and/or mechanisms for retracting and extending the main undercarriage of the aircraft.

According to one aspect of the invention each hydraulic drive 10, 20, with in each case two hydraulic pumps 11, 12 or 21, 22, the clutches and the adjustable transmission gear, is arranged on an engine pylon and outside the engine burst region EB of the aircraft F. In this context the term "engine burst region" EB refers to the region in which engine components become detached with a technically relevant probability in the case where the engine disintegrates as a result of engine damage during operation (engine burst case). In particular, the engine burst region (EB) is considered to be the region situated in front of a surface of a straight circular cone whose tip is situated in the centre of the rearmost turbine wheel of the engine, in whose proximity the respective hydraulic drive 10, 20 is arranged, with half its opening angle being 10 degrees.

Generally speaking, in this arrangement it can be provide for each hydraulic drive 10, 20 to be implemented as a construction unit. In this arrangement a hydraulic drive 10, 20 can be designed so as to be integrated in a housing.

By means of the hydraulic supply device H according to the invention a hydraulic supply of an aircraft can be implemented with little equipment expenditure and thus with a minimum error rate, which hydraulic supply can at the same time meet normal safety requirements. In the context of such a hydraulic supply device H in particular a hydraulic drive according to the invention can be used.

An exemplary embodiment of a hydraulic drive according to the invention is shown in FIG. 2, which illustrates an example of an embodiment of a first hydraulic drive 10. In a hydraulic supply device H according to the invention the second hydraulic drive 20, which in this arrangement is arranged on a different engine from the first hydraulic drive 10, can be designed so as to be identical to the first hydraulic drive 10. The first hydraulic drive 10 comprises a gear 13 that can be designed as a transfer case and in particular as an adjustable transmission gear or as a gear with a fixed or constant transmission ratio. As an input shaft for the gear 13 a drive shaft 1a is provided, and as an output shaft of the gear a driven shaft 13a is provided. The drive shaft can be identical to a connecting shaft that is coupled to an engine shaft or a load transmitting shaft.

Generally speaking, in a hydraulic drive according to the invention the first hydraulic pump 11 is coupled by way of a clutch 15, and the second hydraulic pump 12 is coupled by way of a clutch 16 to the driven shaft 14 of the adjustable transmission gear 13. In this arrangement the clutches 15, 16 can each form part of the hydraulic pump. In the exemplary embodiment of FIG. 2 the clutches 15, 16 are arranged outside the hydraulic pumps 11, 12 and on the gear 13 within the gear housing 13a. In this arrangement the first clutch 15 couples a shaft 31a on the gear end to a pump drive shaft 17 of the first hydraulic pump 11, wherein the shaft 31a on the gear end is connected in a nonrotational manner to a driven shaft 14 of the gear 13. Furthermore, the second clutch 16 couples a shaft 32a on the gear end to a pump drive shaft 18 of the second hydraulic pump 12, wherein the shaft 32a on the gear end is coupled in a rotary manner to a driven shaft 14 of the gear 13 by way of an intermediate wheel 33. With the use of the intermediate wheel 33 it is possible to use hydraulic pumps 11, 12 of identical design in the hydraulic drive 10, 20. As an alternative, the shaft 32a, on the gear end, of the second clutch 16 can also be directly coupled in a rotary manner to a driven shaft 14 of the gear 13. According to a further alternative, the second hydraulic pump 12 can also be situated on the side of the gear 13 that is opposite the side on which the first hydraulic pump 11 is arranged.

In another exemplary embodiment more than two hydraulic pumps are arranged in a hydraulic drive 10, 20, which pumps in each case are coupled in a rotary manner to the driven shaft of the gear 13.

The hydraulic pumps provided according to the invention can, in particular, comprise an output range of between 100 and 200 liters/min. In special application cases it is also possible to provide for an output range of between 50 and 200 liters/min.

The clutches 15, 16 are generally designed as electrically operable clutches; they are functionally connected to a monitoring and drive device that can generate commands for adjusting the clutches 15, 16, and that in order to change the respective adjustment state of the clutches can transmit these commands to said clutches. By disengaging a clutch 15, 16, i.e. by moving a clutch to its disengaged state, the associated hydraulic pump 11 or 12 is no longer driven by the engine to which the associated gear 13 is coupled. Electrically driving the clutch makes it possible, in particular, to engage and/or disengage the clutch also in flight. The clutches 15, 16 comprise in particular also a sensor device or sensors which are functionally connected to the monitoring and drive device and on request by the monitoring and drive device, or independently, provides/provide status feedback to said monitoring and drive device as to whether the clutch is in its engaged or disengaged state. Conversely, that hydraulic pump 11, 12 is driven by an engine by way of the gear 13 and the clutch in the engaged state of the clutch. The clutch 15, 16 or the clutch device is of a type to be switched extraneously, i.e. is switchable by a monitoring and drive device or some other signal generator, and can be designed as a magnetic clutch or as a viscous clutch. With integration of the hydraulic drive 10, 20 according to the invention with corresponding aircraft system functions the following advantages result:

The engine can be started with the engine pumps disengaged so that less starter motor power is required.

During flight phases with a reduced power output one of the two pumps of a hydraulic system can be disengaged and when required can be engaged by an automatic device or by the pilot. This results in a reduction in the fuel consumption and less wear and tear in the hydraulic pumps.

The clutch can, in particular, comprise a torque-limiting device. Consequently the clutch can act as an overload protection device in that it slips if there is excessive torque, and in this way protects the pump and the engine against damage. Furthermore, in the case of corresponding functions of the monitoring and drive device and system components in particular cases, and in particular when it is detected that the hydraulic pressure in a hydraulic system drops below a predetermined minimum value despite the hydraulic pumps operating, e.g. as a result of loss of fluid in the fluid reservoir of the hydraulic system, the hydraulic pumps connected to this hydraulic system can be switched off in order to prevent as far as possible any damage to the hydraulic pumps.

The clutch as a switchable clutch can, in particular, be designed as a viscous clutch.

By providing the clutches 15, 16 for the hydraulic pumps it is possible to arrange the hydraulic pumps on an engine and nevertheless in a safe region of said engine, and in this way to provide for the hydraulic pumps to be driven by the engine. In particular, in this arrangement the hydraulic pumps driven by an engine can be arranged outside the engine burst region. This can result in further simplification of hydraulic systems regarding a reduction of necessary components in order to meet usual safety requirements.

In another exemplary embodiment a clutch is associated with only one of two hydraulic pumps, i.e. in this case only one of the two pumps can be decoupled from the engine shaft.

The gear 13 of the hydraulic system 10, 20 can comprise rotary speed control with the objective of keeping the rotary speed of the pumps constant in the entire range of engine speeds, or at least in a predeterminable rotary speed range. In this way the rotary speed of the pumps can be kept constant independently of the rotary speed of the engine. In order to control the rotary speed a regulating unit or control unit can be provided which in order to adjust the transmission ratio of the gear is functionally connected to said gear, and a rotary-speed sensor can be provided that is integrated in the pump drive of the hydraulic pump, which rotary-speed sensor is functionally connected to the gear control unit, wherein in the control unit a desired rotary speed or a desired rotary speed range is predetermined, or is supplied to said control unit, and wherein the control unit drives and adjusts the gear in an operation-dependent and time-dependent manner in such a way that the hydraulic pump observes a desired rotary speed with permitted deviations or observes a desired rotary speed range.

In its embodiment as an adjustable transmission gear the gear can be designed as a sliding-element gear.

Furthermore, the gear is integrated in a gear housing 13a. The clutches, when arranged outside the hydraulic pump housing, can be affixed in the gear housing or on the gear housing 13a. The rotary speed controller can be designed as an electronic controller device with an operating device for adjusting the gear. The controller device with the operating device can be integrated in the gear housing 13a or in a controller housing (not shown in the figure) that is affixed to the gear housing 13a and is, for example, flanged onto said gear housing 13a. The transfer case, by means of which a gear driven shaft 14 is coupled as an input shaft to the two clutches 15, 16, can also be integrated in the gear housing 13a or in a transfer case housing (not shown in the figure) that is affixed to the gear housing 13a and is, for example, flanged onto said gear housing 13a.

The gear controller can also be a functional component of the monitoring and drive device so that the monitoring and drive device merely transmits actuator commands to the gear 13 in order to adjust said gear.

In a further exemplary embodiment the gear drive shaft 1a is coupled to a transfer case that transmits rotation of the gear drive shaft 1a to two input shafts 31a, 32a for the clutches 15 or 16. In this embodiment the hydraulic pumps 11, 12 can comprise a rotary speed controller as described in previous paragraphs.

The hydraulic supply device H according to the invention comprises a first A and a second B hydraulic system, in particular for operating actuators of the aircraft; a monitoring and drive device; as well as two hydraulic drives. Of the hydraulic drives a first hydraulic drive 10 is provided for coupling to an engine shaft of a first engine 1, and a second hydraulic drive 20 is provided for coupling to an engine shaft of a second engine 2. In this arrangement, in particular, it is provided for the first engine 1 and the second engine 2 to be arranged on opposite sides relative to the aircraft's longitudinal axis. In this arrangement, each hydraulic drive 10, comprises: a gear drive shaft 1a; 2a for coupling the respective hydraulic drive 10, 20 to an engine output shaft of the respective associated engine 1; 2, two hydraulic pumps 11, 12 or 21, 22 that are coupled to a gear output shaft, with in each case a connection device 41 or 42 for connecting the hydraulic pump to the pressure line and to the suction line of a hydraulic system A, B. In particular, the hydraulic drives 10, 20 can be designed according to one of the embodiments provided for them according to the invention.

According to a further aspect of the invention, an aircraft F is provided with a hydraulic supply device H and with two engines 1, 2, each affixed to an engine pylon, with several hydraulic systems A, B for operating actuators of the aircraft and with a monitoring and drive device for adjusting the hydraulic systems. In this arrangement two or more than two hydraulic systems A, B can be provided. In this arrangement the hydraulic supply device H comprises: a hydraulic drive coupled to an engine 1, 2 by way of a drive shaft, which hydraulic drive is arranged on an engine pylon and outside the rotary circle of the turbine (engine burst region) and/or behind the engine burst region EB of the respective engine 1; 2. Affixation to an engine pylon means that the hydraulic drive 10, 20 is affixed to a carrier part and in particular within the engine pylon. In particular, an adjustable transmission gear or transfer case of the hydraulic drive can be affixed to the pylon. The term "engine burst region" EB refers to the region in which the effect of engine damage can manifest itself with technically relevant probability. In this arrangement the engine burst region EB refers in particular to a region in front of the surface of a cone of a straight circular cone whose tip is situated in the centre of the rearmost turbine wheel of the engine, and whose half opening angle $\alpha$ is at least 10 degrees. Furthermore, the hydraulic supply device H can be designed according to an one of the embodiments described herein. The hydraulic drives of the hydraulic supply device H can be designed according to any one of the embodiments described herein.

The aircraft according to the invention has at least one engine, that can, in particular, be a gas turbine engine. Furthermore, on the gear an auxiliary device for converting mechanical shaft output of the engine to electrical, hydraulic and/or pneumatic energy can be arranged.

According to the invention, the hydraulic drive can be attached with or without the auxiliary device to the airframe of the aircraft outside the engine burst region and fire zone of the engine, wherein the term "airframe" refers in particular to the supporting structure, fuselage and tail unit or the engine brackets.

Figure 3:
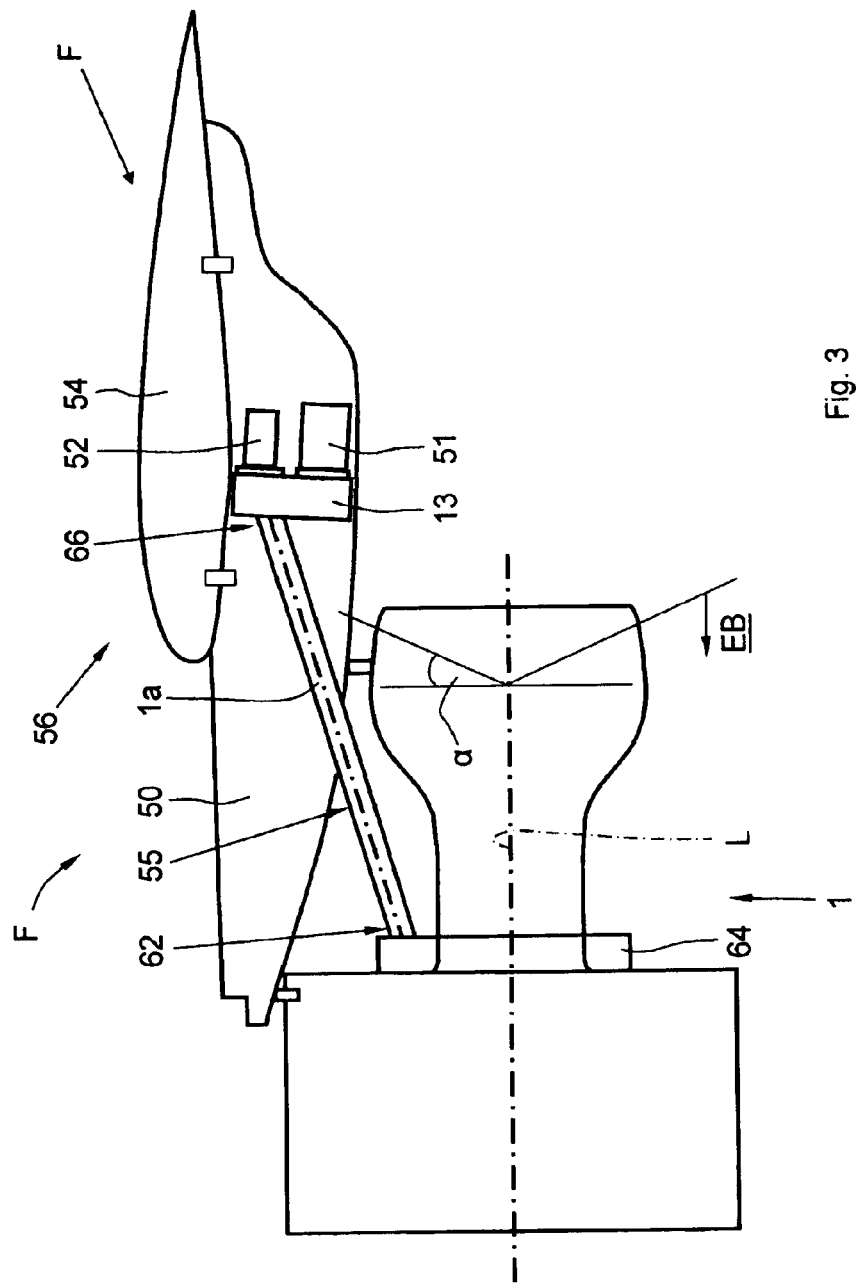
FIG. 3 shows a diagrammatic section view of an embodiment according to the invention of a hydraulic drive with a gear, a gear drive shaft for coupling the gear to an engine shaft, with two engine pumps each for operating a hydraulic system and with two clutches, one of which is in each case associated with an engine pump.

According to a further exemplary embodiment of the invention, as an alternative, or in addition to it, an aircraft comprising at least one engine 1, 2, which, in particular, can be a gas turbine engine, and comprising an airframe is provided (FIG. 3). On the airframe, and in particular on the engine pylon 50, at least one auxiliary device 51, 52 for converting mechanical shaft output of the engine 1, 2 to electrical, hydraulic and/or pneumatic energy is attached. The supply of the auxiliary device 51, 52 takes place with mechanical shaft output by way of a drive connection 55 that is coupled to a drive shaft or power gear shaft of the engine 1. The engine 1 is attached by way of an engine bracket or engine pylon 50 in front of and underneath an aerofoil 54 of the airframe 56 of the aircraft F. The auxiliary devices can be connected to a gear 13 which can be designed according to an exemplary embodiment of the invention and which can be driven by the drive connection 55, preferably in the form of a gear drive shaft that can be rotationally coupled to an engine shaft or a power gear shaft of the engine. The gear 13 can, in particular, be coupled to the low-pressure compressor of an engine (fan-mounted). For example, an electric generator 51 and a hydraulic pump 52 or several of the aforesaid can be provided as auxiliary devices which can be used in a hydraulic supply device H according to the invention. In this arrangement a first end section 62 of the drive connection 55 can be connected to a gear 64 associated with the engine 1, and a second end section 66 can be connected to the gear 13 that carries the auxiliary devices 51, 52. The drive shaft 1a can extend obliquely to a longitudinal axis L of the engine 1. The drive connection 55 can also comprise two shaft sections 55a, 55b that are connected or coupled by way of an angle drive 68 that is attached to the airframe 56 on or within the engine bracket 50. In the embodiment shown, a first shaft section 55a of the drive connection 55 extends approximately perpendicularly, and a second shaft section 55b extends approximately parallel, to the longitudinal axis L of the engine 4. Generally speaking, in one exemplary embodiment the shaft sections 55a, 55b extend at an angle to each other. A first end section 71 of the first shaft section 55a can be coupled to the engine shaft or an engine gear 64, and a second end section 72 can be connected to the angle drive 68. A first end section 73 of the second shaft section 55b is coupled to the angle drive 68, and a second end section 74 is coupled to the gear 13. In this exemplary embodiment the drive connection 55 can generally also comprise at least two shaft sections 55a, 55b which in each case are interconnected by way of a gear or an angle drive. Furthermore, the shaft sections 22a, 22b can be arranged at any angle to each other. Moreover, the drive connection 55, or, the angle drive 68, the gear 13 and/or an auxiliary gear can be associated upstream or downstream thereof with a clutch device, by means of which disengaging and/or engaging the aforementioned components is possible. Furthermore, several hydraulic pumps or generators can be operated in parallel as auxiliary devices so that failsafe performance of the entire arrangement can be significantly improved.

In the aircraft according to the invention or in the hydraulic supply device H according to the invention according to one or several of the above-mentioned exemplary embodiments the monitoring and drive device is functionally connected to a flight control function and is functionally connected to each of at least two hydraulic pumps of a hydraulic drive, wherein on two different engines in each case at least one such hydraulic drive is arranged and driven by the respective engine. According to an exemplary embodiment of the invention, the monitoring and drive device communicates with the flight control function in such a way that the latter transmits a signal to the monitoring and drive device when the aircraft is in cruising flight. This can be manually predetermined for the flight control function, or it can be provided for the flight control function to automatically determine a cruising operating state. For determining a cruising operating state, sensor values can be used, e.g. a determined flight altitude. In this case the signal that indicates a cruising operating state of the aircraft can be generated by the flight control function as soon as the determined flight altitude drops below a predetermined flight altitude. Based on the monitoring and drive device receiving the signal that indicates a cruising operating state of the aircraft, said monitoring and drive device generates a command signal to switch off hydraulic pumps. The monitoring and drive device then transmits this switching-off signal in each case to a hydraulic pump of two hydraulic systems 10, 20 according to an embodiment according to the invention which are arranged on two different engines 1, 2, wherein on each hydraulic system 10, 20 two or more than two hydraulic pumps 11, 12 that are driven by the respective engine 1, 2 are integrated. As an alternative it can also be provided for only one hydraulic pump to be switched off on one hydraulic system 10, 20. By switching-off a hydraulic pump 11, 12 of a hydraulic system on one or several engines 1, 2 fuel consumption during cruising is reduced. Conversely, in this exemplary embodiment it is provided for these hydraulic pumps to be able to be activated or switched on again, i.e. operated, by the monitoring and drive device when said monitoring and drive device has received a signal to quit cruising flight. In the example mentioned this may relate to dropping below a flight altitude that represents the minimum cruising altitude of the aircraft between takeoff, landing or low-level flight and cruising. To this effect the hydraulic pumps 11, 12 are designed in such a way that they can be switched on and off by means of a monitoring and drive device.

According to the invention, a method for reconfiguring or setting a hydraulic system of an aircraft is thus provided, in which method a monitoring and drive device of the aircraft in response to a signal from a flight control function, which signal indicates that a flight operating state with low energy requirements and safety requirements or a cruising operating state has been reached, a command signal is transmitted in each case to two hydraulic pumps 11, 12; 21, 22 that drive two different hydraulic systems A, B of a hydraulic supply system H in order to switch off said hydraulic pumps 11, 12; 21, 22. In this arrangement it can, in particular, be provided for the hydraulic pumps to be mechanically coupled in each case to one of two different engines 1, 2 and in this arrangement in each case as one of several hydraulic pumps in each case to one of the two different engines 1, 2. As an alternative, when the cruising minimum condition has been reached, or when the aircraft is no longer cruising, it can be provided that in each case a hydraulic pump of two hydraulic drives that are driven by an engine are switched off or on if more than two hydraulic drives are driven by one engine. In this arrangement it can be provided for these hydraulic drives to operate two or more than two hydraulic systems of the aircraft. Thus in this method it is generally provided for the two hydraulic pumps 11, 12; 21, 22 of a hydraulic supply system H, which have been switched off based on the signal based on a cruising operating state, to be switched on again as soon as a flight phase with increased energy requirements or safety requirements is initiated or attained.

The monitoring and drive device can be functionally designed such that switching off the hydraulic pumps 11, 12 of a hydraulic drive 10 takes place alternately so as to achieve largely even wear and tear of the two pumps. Alternate switching on and off of two or more than two hydraulic pumps of a hydraulic drive can be provided for based on predetermined time slices during cruising operation or from cruising flight to cruising flight.

With the provision of a pressure switch in the pressure line downstream of a hydraulic pump, it is possible to verify in operation that the respective hydraulic pump is intact. The monitoring and drive device can additionally comprise a monitoring function by means of which the state of being "defective" is assigned to a hydraulic pump if during operation of said hydraulic pump the pressure switch in the pressure line that is connected to this hydraulic pump transmits a pressure value to the monitoring function, at which pressure value the monitoring function determines that a pressure drop in the pressure line beyond a predetermined limit value is present. The monitoring and drive device can be designed such that in this case the hydraulic pump that is assessed to be defective is no longer activated by the monitoring and drive device. At the same time it can be provided for the monitoring and drive device to no longer deactivate or switch off the hydraulic pump that is associated with the hydraulic drive that is driven by the respective other engine and that drives the same hydraulic line system A, B that also drives the hydraulic pump that has been assessed as being "defective". As an alternative or in addition, in the allocation of the state of being "defective" to a hydraulic pump it can be provided for a function of the monitoring and drive device to transmit a control signal to the clutch that is associated with the hydraulic pump that is considered to be "defective", in order to bring this clutch into its disengaged state so that the hydraulic pump concerned is no longer driven by the respective engine.

Furthermore, the monitoring and drive device can comprise an engine burst reconfiguration function that recognises an engine burst case, e.g. by receiving a corresponding engine signal. As an alternative or in addition, the monitoring and drive device can also assume that an engine burst case has occurred if the pressure switches of two different hydraulic pumps of a hydraulic drive in a predetermined period of time indicate a drop in pressure in the pressure lines to below a predetermined minimum pressure value. The monitoring and drive device or the engine-burst reconfiguration function can be designed so that the hydraulic pumps that can be driven by the respective other engine that is still intact are activated. In this arrangement it can be provided for the monitoring and drive device to transmit an activation signal only to those hydraulic pumps from which said monitoring and drive device has received a non-activated signal in order to switch them on, or for the monitoring and drive device to transmit an activation signal to all the hydraulic pumps of the respective other engine in order to switch said engine on.

This can, in particular, be provided in conjunction with the function which in cruising flight handles switching-off or switching-over hydraulic pumps. This prevents failure of a hydraulic system A, B in the case of an engine burst.

According to a further exemplary embodiment of the invention it can be provided for each of the two hydraulic systems A, B to supply actuators of retraction and extension mechanisms of the aircraft's undercarriage. In particular, it can be provided that the hydraulic systems A, B which are operated by the hydraulic pumps driven by engines operate all the actuators of the retraction and extension mechanisms of the undercarriages of the aircraft. The term "undercarriages" can relate, for example, to the main undercarriage, arranged underneath the connection positions between the main wing and the aircraft fuselage, and to the nose undercarriage.

According to an exemplary embodiment of the invention, the hydraulic systems are exclusively operated by hydraulic pumps that are driven by the engines. In particular, the invention provides for the hydraulic drives with the hydraulic pumps to be affixed outside the engine burst region EB and in this arrangement in particular on the engine pylon. This makes it possible in the case of an engine burst to keep alive the hydraulic systems responsible for the undercarriages, or the hydraulic system responsible for the undercarriage, at half their/its output.

Each hydraulic system A, B comprises a liquids reservoir with a filling level sensor that is functionally connected to the monitoring and drive device. According to the invention it can additionally be provided for the filling level sensor to transmit a signal to the monitoring and drive device if the filling level drops below a minimum value. In this arrangement it can further be provided for the monitoring and drive device to comprise a function by means of which in response to a signal from the filling level sensor, due to the filling level having dropped below a minimum value, a control signal is transmitted to the clutches of those hydraulic pumps that are connected to the hydraulic system of which the liquids reservoirs with the filling level sensor that transmitted the signal form part.

The invention claimed is:
1. An aircraft, comprising:
a first and a second engine,
an aircraft system,
a fail-safe hydraulic supply device being driven by the engines and comprising a first and a second hydraulic system for operating actuators of the aircraft system and a monitoring and drive device for controlling the hydraulic supply device, the hydraulic supply device including:
a first hydraulic drive that is coupled to a gear drive shaft of the first engine, the first hydraulic drive comprising:
a first hydraulic pump coupled to the first hydraulic line system and having a first hydraulic-pump drive shaft coupled to the gear drive shaft of the first engine and a second hydraulic pump coupled to the second hydraulic line system and including a second hydraulic-pump drive shaft coupled to the gear drive shaft of the first engine,
a gear comprising the gear drive shaft for rotary coupling to an engine output shaft of the first engine and with a gear driven shaft,
a coupling device for rotary coupling of the gear driven shaft and at least a first shaft on a gear end and a second shaft on the gear end rotary coupled thereto,
a clutch coupling device for rotary coupling and decoupling of the respective one of the first shaft and the second shaft on the gear end and the respective one of the first and second hydraulic-pump drive shafts of the first or second hydraulic pump, wherein the clutch coupling device comprises at least one clutch which is designed as an operable clutch, each of the first and second hydraulic pump drive shafts rotary coupled with each other and each of the first and second hydraulic pump drive shafts decoupled or coupled to the gear drive shaft of the first engine with the at least one clutch,
a second hydraulic drive coupled to a second gear drive shaft of the second engine and the second hydraulic drive comprises:
a first hydraulic pump coupled to the first hydraulic line system having a first hydraulic-pump drive shaft coupled to the gear drive shaft of the second engine and a second hydraulic pump coupled to the second hydraulic line system having a second hydraulic-pump drive shaft coupled to the gear drive shaft of the second engine, the first and the second hydraulic-pump drive shafts rotary coupled with each other and the first and the second hydraulic-pump drive shafts are decoupled or coupled to the gear drive shaft of the second engine by at least one clutch, and
the monitoring and drive device which respectively is coupled with the clutch coupling device and the monitoring and drive device based on a signal from a flight control function that indicates a cruising operating state outputs a command signal to switch off one of the first hydraulic pump and the second hydraulic pump of the first hydraulic drive and to switch off one of the first hydraulic pump and the second hydraulic pump of the second hydraulic drive,
wherein the command signal switches off one of the first hydraulic pump and the second hydraulic pump coupled to the gear drive shaft of the first engine and one of the first hydraulic pump and the second hydraulic pump coupled to the gear drive shaft of the second engine.

2. The aircraft according to claim 1, wherein the monitoring and drive device is functionally connected to each hydraulic pump and comprises a function by means of which the monitoring and drive device can transmit a drive signal to each clutch, based on which the respective hydraulic pump is decoupled.

3. The hydraulic supply device according to claim 1, wherein the two hydraulic pumps of a hydraulic supply system, which pumps have been switched off due to the signal due to the cruising operating state, are switched on again as soon as a flight phase with increased energy requirements and safety requirements is initiated or attained.

4. The aircraft of claim 1, wherein:
   the first engine and the second engine are each affixed to an engine pylon; and
   the first hydraulic drive is arranged on the engine pylon and behind an engine burst region of the first engine.

5. The aircraft according to claim 4, wherein the engine burst region is located at a centre of a rearmost turbine wheel of the engine and extends outward at an angle of 10 degrees creating a cone-like shape, wherein the cone is directed rearward along a longitudinal axis of the aircraft.

\* \* \* \* \*